United States Patent [19]

Jacobs

[11] Patent Number: 4,807,746
[45] Date of Patent: Feb. 28, 1989

[54] PRE-MIXED THERMOPLASTIC UNITS AND METHOD OF USING SAME

[76] Inventor: William A. Jacobs, 711 Notre Dame, Edwardsville, Ill. 62025

[21] Appl. No.: 80,480

[22] Filed: Jul. 31, 1987

[51] Int. Cl.$^4$ .......................... B65D 69/00; E01C 7/08
[52] U.S. Cl. ........................... 206/321; 126/343.5 A; 206/447; 432/92
[58] Field of Search .............. 126/343.5 R, 343.5 A; 206/321, 447; 264/333; 432/92, 209

[56] References Cited

U.S. PATENT DOCUMENTS

| | | | |
|---|---|---|---|
| 2,108,784 | 2/1938 | Stockdale | 126/343.5 A |
| 2,476,431 | 7/1949 | Root, Jr. | 126/343.5 |
| 2,607,337 | 8/1952 | Miller | 126/343.5 |
| 2,690,172 | 9/1954 | Miller | 126/343.5 |
| 2,726,788 | 12/1955 | McIntosh | 222/1 |
| 3,092,098 | 6/1963 | Moore et al. | 126/343.5 A |
| 3,554,449 | 1/1971 | Currie | 126/343.5 A |
| 3,995,616 | 12/1976 | Schrader | 126/343.5 A |
| 4,050,740 | 9/1977 | Ellithorpe et al. | 299/6 |
| 4,445,848 | 5/1984 | Heller | 126/343.5 A |

Primary Examiner—Jimmy G. Foster
Attorney, Agent, or Firm—Senniger, Powers, Leavitt and Roedel

[57] ABSTRACT

A preformed unit in solid-state form adapted for transport and subsequent conversion to a fluid state, the unit comprising a body of thermoplastic material having heater means embedded therein adapted for melting the thermoplastic material, the unit being adapted for storage and transport with said body in solid state form and subsequent heating of the body via said heater means at a work site to provide the thermoplastic material in a fluid state.

21 Claims, 2 Drawing Sheets

PRE-MIXED THERMOPLASTIC UNITS AND METHOD OF USING SAME

This invention relates generally to the preparation of thermoplastic materials for use at a construction or other work site and more particularly to the provision of thermoplastic construction materials in a pre-mixed form adapted for immediate use at a work site upon melting of the material.

Sulfur concrete, a thermoplastic concrete comprising sulfur as the binder and a mixture of aggregates, offers many advantages over portland cement. Sulfur concrete offers excellent corrosion resistance, high physical strength, high fatigue resistances, low water permeability and the ability to be poured in sub-zero temperatures without freezing problems. Sulfur concrete attains its strength within hours instead of weeks as with portland cement. Additionally, the properties of sulfur concrete can be tailored for specific applications, e.g., where toughness or impact resistance may be required, or for use in chemical tanks and floors where continuous exposure to acids may occur.

However, many applications for which sulfur concrete would be ideally suited require quantities of 3 to 4 cubic yards of sulfur concrete or less, e.g., floors and trenches that are exposed to chemicals and pump bases that require good fatigue strength to survive the vibration associated with pumps. For quantities in this range, it is not economically practical to assemble the processing equipment necessary to prepare sulfur concrete at the work site. In addition, mixing at the work site requires crews having expertise in the formulation of sulfur concrete and during the busy summer construction season, scheduling may be quite difficult.

Furthermore, high quality sulfur concrete requires non-porous, crushed aggregate that is free of moisture and sized properly. Thus, when sulfur concrete is mixed at the work site, the quality of the resulting concrete is dependant upon the character of the locally available aggregate. And while the sulfur concrete mix can be varied to take into account the character of the aggregate used, this involves a degree of skill and an accompanying risk that the work may fail because the mix was less than ideal.

Nor is it commercially practical to transport sulfur concrete to the work site from a manufacturer's plant in a molten condition. Heated mixer trucks are required for such a task and demand for the material is not great enough in most regions of the country to justify the sizeable investment required for such a truck. Thus, in most areas sulfur concrete is not even locally available in this form.

Other thermoplastic materials suffer from similar limitations. Many such thermoplastic materials such as joint sealant, asphalt, roofing materials, and hot melt glues and paints are restricted in their use because of the equipment necessary to process or transport these materials to the work site. Either these materials must be prepared and transported in a molten state, liquified with a solvent that will evaporate into the atmosphere when the material is used (with the accompanying adverse effects on the environment), or they must be prepared at the manufacturer's location, allowed to solidify and transported to the work site where it is then necessary to use specialized equipment to return the material to a molten state.

SUMMARY OF THE INVENTION

Among the objects of the invention, therefore, may be noted the provision of a unit comprising pre-mixed thermoplastic construction material adapted for use at a work site without the need for scheduling a site mix crew; the provision of this unit in solid-state form adapted for transport, even across great distances at a reasonable cost; the provision of this unit in a form adapted for conversion of the solid-state thermoplastic material to a fluid state for use at the work site; the provision of this unit in sizes adapted for economical use in tasks that require relatively small quantities; and the provision of a method of incorporating the thermoplastic material into a mass at the work site.

Briefly, therefore, the present invention is directed to a preformed thermoplastic unit in solid-state form adapted for transport and subsequent conversion of the thermoplastic material to a fluid state. The preformed unit comprises a body of thermoplastic material having heater means embedded therein adapted for melting the body of thermoplastic material. The unit is adapted for storage and transport with the body in solid state form and subsequent heating of the body via the heater means at a work site to provide the thermoplastic material in a fluid state.

The present invention is also directed to a method for incorporating a thermoplastic material into a mass. The method comprises providing a body of solid state thermoplastic material having heater means embedded therein for heating the body, melting the body of solid state thermoplastic material via the heater means, and incorporating the melted thermoplastic material into the mass.

Other objects and features will be in part apparent and in part pointed out hereinafter.

DESCRIPTION OF THE PREFERRED EMBODIMENTS

In accordance with the present invention, a novel preformed thermoplastic unit has been discovered which is uniquely adapted for use in construction applications. The thermoplastic construction material is pre-mixed at a manufacturing site, cast with heater means substantially throughout the volume of material and then shipped to the construction site in a solid-state form. Because these units are transported in a solid-state form, work-site scheduling is not a major consideration. The preformed units may be shipped to the construction site and inventoried until needed. And when the construction crew is ready, the material is converted to a fluid or molten state by utilizing the heater means embedded within the thermoplastic material. Significantly, if the construction crew does not use the entire quantity of thermoplastic material thus provided, the remaining units (and partial units) are refrozen about the heater means and inventoried until the next project. At that time, the remaining material is returned to a fluid via the heater means. Additionally, spilled material and material that freezes to tools, forms, wheelbarrows and other such equipment can be remelted for subsequent use.

In a preferred embodiment, the body of thermoplastic material has a cylindrical shape and the heater means comprises a tube, a portion of which is embedded in the body. In a most preferred embodiment, the heater means comprises a tube, the embedded portion of which is a helical tube concentric with and extending substantially the entire length of the body of thermoplastic material. The ends of the tube are located outside the body and serve interchangeably as the inlet and outlet for steam or other suitable heating fluids such as hot oils that are passed through the tube to heat the thermoplastic material until it is sufficiently softened for use, Preferably, the ends of the tube are located atop the body of thermoplastic material.

Figure 1:
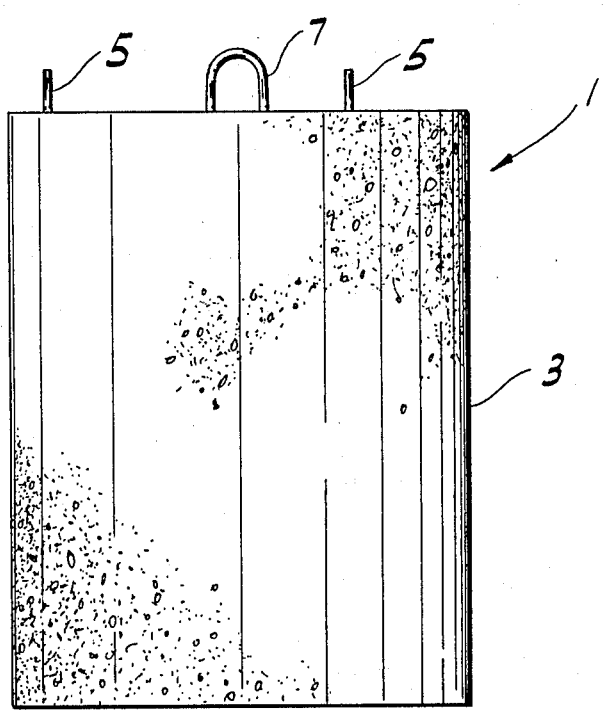
FIG. 1 is a side elevation of the preformed unit of the present invention.

FIG. 1 depicts a preformed unit of the present invention. The preformed unit 1 comprises a cylindrical body of thermoplastic material 3 in solid-state form having heater means embedded therein (not shown). The body of thermoplastic material is not packaged within a container and thus, the surface of the body is exposed to the surrounding environment. The heater means comprises a tube, the embedded portion of which comprises a helical coil (not shown), the tube having ends 5. Lifting lug 7 anchored in the thermoplastic material is adapted for handling of the unit.

Figure 2:
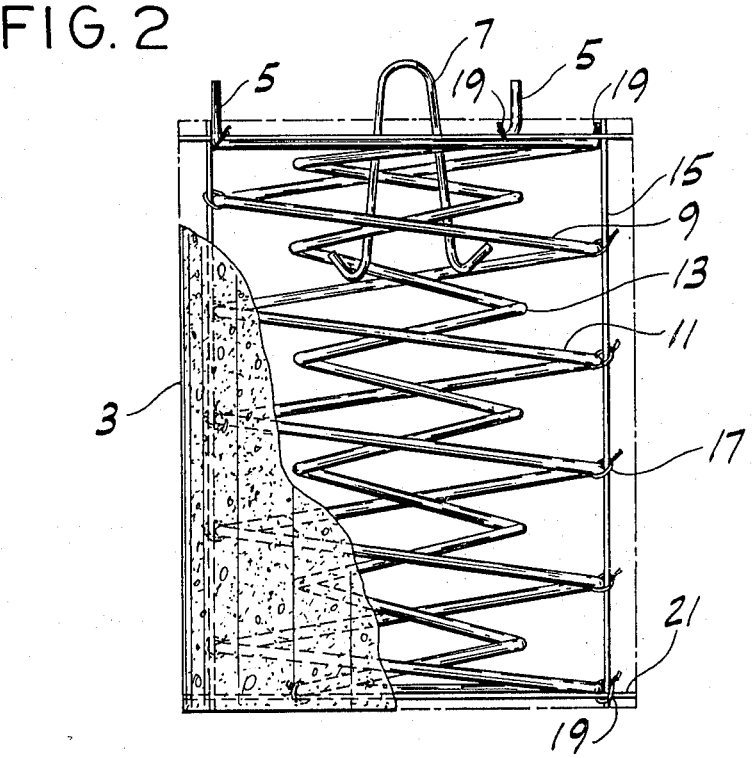
FIG. 2 is a side of elevation of the preformed unit of the present invention with part broken away.

FIG. 2 further depicts the preformed unit of the present invention with part broken away for further viewing. Heater means 9 comprises a tube, a portion of which is embedded in body 3, the embedded portion comprising two helical coils 11, 13 of differing diameter. The tube has tube ends 5 that serve interchangeably as an inlet and an outlet for heating fluids that are passed through the tube to heat the body. Helical coil 11 is attached to frame 15 by means of wires 17 along the sides of frame 15 and helical coil 13 is attached to frame 15 by means of wires 19 at the top and bottom of frame 15. Frame 15 holds heater means 9 in place as the thermoplastic material is poured about the heater means and allowed to freeze. Lifting lug 7 is roughly in the shape of the Greek letter omega with each leg of the omega being attached at a point along their length to the top of frame 15. Frame 15 comprises 4 wires welded together in the shape of a rectangle, each of the wires having a portion 21 extending beyond the corners of the rectangle. The extending portions 21 serve as a spacer between the top, bottom and sides of the body 3 and the heater means 9.

Figure 3:
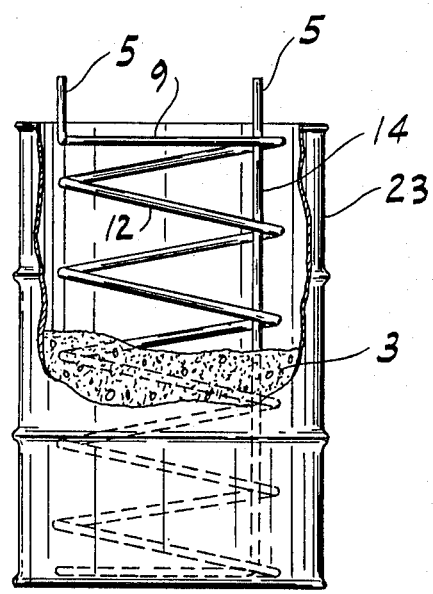
FIG. 3 is a side elevation of an alternative embodiment of the preformed unit of the present invention with part broken away.

FIG. 3 depicts an alternative embodiment of the preformed unit of the present invention with part broken away for viewing. In this embodiment, the preformed unit comprises a drum 23 containing a body 3 of solid-state thermoplastic material having heater means 9 embedded therein. Heater means 9 comprises helical coil 12, straight length 14 and tube ends 5.

Upon arrival of the preformed units at the work-site, the solid-state thermoplastic material is converted to a molten state by utilizing the heating means. Preferably, the heater means comprises a helical tube and the material is melted by passing steam through this tube. When the unit is sufficiently melted to permit use of the material, the source of steam is disconnected and the material is poured or otherwise incorporated into the mass being constructed or repaired. To reduce the amount of time required to melt the thermoplastic material, it is preferred that the unit be insulated while the source of steam is connected.

These preformed units are particularly well suited for sulfur concrete. In a preferred embodiment of this invention, the preformed units contain approximately one cubic yard of sulfur concrete each (or less) which are transported to the construction site in a solid-state and melted when ready for use. When preformed in the shape of a cylinder as depicted in FIGS. 1 and 2, the body 3 is self-supporting (i.e, not packaged within a container) and has a diameter of 36 inches and a height of 46 inches. To impart such a cylindrical shape to the unit, sulfur concrete is poured into a 36 inch diameter, 46 inch high cylindrical mold made from a 46 inch wide, 10 feet long 10 gauge metal sheet that has been wrapped about a central axis, the meeting edges being bolted or otherwise joined. Before the sulfur concrete is poured into the mold, a $36'' \times 46''$ frame 15 constructed from 3/16" wire having a heater means 9 and a lifting lug 7 attached are set in place in the mold, each of the wires forming the frame 15 having portions 21 which extend approximately 3 inches beyond the corners of the rectangle (the dimensions of the rectangle being approximately $30'' \times 40''$). The lifting lug 7 is formed from $\frac{1}{2}''$ reinforcing rod bent in the form of an omega. The heater means 9 is a tube, the embedded portion of which comprises helical coils 11, 13 connected in series near the bottom of the frame. The spiral diameter of helical coil 11 is approximately 30 inches and the spiral diameter of helical coil 13 is approximately 18 inches. Preferably, the tube has a tubular diameter between $\frac{1}{4}$ inch to 1 inch and most preferably has a diameter of $\frac{3}{8}$ inch or $\frac{1}{2}$ inch. The tubing is preferably stainless steel, carbon steel or aluminum; copper tubing is preferably avoided when used with sulfur. The helical coil 11 is attached to frame 15 via 1/16 inch soft wires 17 approximately 3 inches in length spaced at approximately 6 inch intervals along each of the two sides of the frame and helical coil 13 is similarly attached via wires 19 at two points each along the top and bottom of the frame 15. Tube ends 5 are an extension of helical coils 11, 13 and extend beyond the surface of the sulfur concrete body 3.

The sulfur concrete is pre-mixed and poured into the 36 inch diameter cylindrical mold in a molten state. Preferably, the temperature of the sulfur concrete is as close as practically possible to 245° F., its freezing temperature, as it is being poured into the mold. Pouring near the freezing temperature reduces the amount of shrinkage, avoids excessive distortion of the body as it solidifies and conserves energy costs. Furthermore, temperatures in excess of 300° F. may degrade the modifier contained in the sulfur concrete and thus impair the quality of the material. Preferably, sulfur concrete is cast at a temperature in the range of about 250° F. to about 275° F.

Approximately 2 hours after the sulfur concrete is poured into the cylindrical mold, the mold may be removed to enhance cooling. Approximately 12 hours after the sulfur concrete is poured, the material has hardened sufficiently to permit the unit to be moved via the lifting lug.

In an alternative embodiment of this invention, the pre-formed unit comprises a 55-gallon drum containing approximately one-fourth of a cubic yard of sulfur concrete having heater means embedded therein. As depicted in FIG. 3, the heater means 9 comprises a tube having a helical coil 12 with a spiral diameter of approximately 18 inches and straight length. Preferably, the tube has a tubular diameter between $\frac{1}{4}$ inch to 1 inch and most preferably has a diameter of ⅜ inch or ½ inch. The tubing is preferably stainless steel, carbon steel or aluminum; copper tubing is preferably avoided when used with sulfur.

Sulfur concrete units of the present invention containing amounts of sulfur concrete greater than one cubic yard, less than ¼ cubic yard and amounts in between may also be provided. A practical consideration, however, is the amount of time required to melt the sulfur concrete utilizing the heating means. Preferably, the sulfur concrete unit is melted within about an 18-24 hour period. In addition, practical considerations concerning transportation and handling may dictate that the units be provided in quantities of approximately one cubic yard or less.

With preformed units comprising sulfur concrete, it is preferred that the heater means be within about 8 inches of any point within the body of sulfur concrete and it is most preferred that the heater means be within about 6 inches of any point within the body of sulfur concrete so that the body can be melted within about 18-24 hours. Accordingly, the shape and size of the preformed unit dictate to some extent the configuration of the heater means. For instance, for preformed units containing quantities greater than one cubic yard of sulfur concrete, it may be preferred that the heater means include a third helical tube.

To melt the sulfur concrete units of this invention, the heater means inlet is connected to a source of steam, preferably saturated steam having a pressure within the range of about 45-70 psig, and most preferably 55 psig saturated steam. The tube outlet is connected to a steam trap and the steam is not disconnected until the sulfur concrete is substantially molten. For the preformed units depicted in FIGS. 1 and 3, the tube ends 5 may be interchangeably used as the inlet and the outlet. As noted above, depending upon the modifier used in the sulfur concrete, temperatures in excess of 300° F. may degrade the quality of the concrete and are thus preferably avoided during melting.

To enhance the melting process, it is preferred that the units be insulated from the environment while the material is being heated via the heater means. For instance, while melting units containing approximately one cubic yard of sulfur concrete, it is preferred that the base of the unit be placed on plywood or other material to insulate the unit from the ground and that the sides be first wrapped with a 4'×10', 26 gauge metal sheet and then a layer of insulation. The insulation comprises approximately 2 inches of polyurethane foam contained between layers of fiber glass cloth impregnated with PVC, the outside of the material fitted with buckles and straps to hold the insulation in place around the sides of the unit. A top similarly constructed of the same insulation material is provided for the top of the unit.

Preferably, the sulfur concrete pre-formed units are melted alongside the pour site. When the material is sufficiently melted, the unit is unwrapped, lifted with a forklift and the contents poured at the desired location. Alternatively, the contents may be wheelbarrowed or otherwise transported to the desired location. The sulfur concrete is then conventionally finished.

Where a task requires multiple units, it is preferred that several units be connected in series using rubber steam hoses to the source of steam. For instance, for one cubic yard sulfur concrete units described herein where the helical tubing comprises ½ inch tubing, it is preferred that no more than 5 units be connected in series and most preferably that the number connected in series be not greater than 3 units. Furthermore, it has been found that connecting the units in series improves the velocity of the steam and accordingly helps push any condensate out of the tubing.

Preformed units comprising containers (e.g., 55 gallon drums) offer an additional feature not possessed by preformed units in which the body of thermoplastic material is not packaged within a container and accordingly exposed to the environment. For tasks that require less than an entire unit, the contents of the preformed units may be melted, part of the contents used and the remainder saved in the container. When it is desired to use the remainder or some part thereof, the contents may again be remelted. This process can be repeated up to about 5 times for sulfur concrete. In each case, the only step necessary to render the material ready for use is the melting of the material via the heater means embedded therein. Thus, maintenance personnel within a facility can maintain a stock of material and use as needed without having to schedule an outside contractor. It should be noted, however, that some modifiers used in sulfur concrete degrade if the material is in a molten state for period in excess of approximately 2 to 3 days. Thus, the modifiers contained within certain sulfur concretes may effectively restrict the number times that a container of sulfur concrete can be melted and refrozen.

Various sulfur concrete compositions are disclosed in the following U.S. Pat. Nos.: 4,311,826; 4,348,313; 4,188,230; 4,308,072; 4,376,830 and 4,376,831. Particularly preferred sulfur concrete compositions for use in accordance with the present invention are disclosed in U.S. Pat. Nos. 4,025,352 and 4,293,463. Most preferred sulfur concrete compositions of the present invention comprise about 10 wt % to about 17 wt % sulfur cement, about 75 wt % to about 83 wt % aggregates and about 5 wt % to about 12 wt % fines, the aggregate excluding limestone. The aggregate of this most preferred sulfur concrete composition is a mix of crushed rock and sand material comprising approximately 25 wt % to 30 wt % of material having a particle size less than ⅜ inch but greater than #4 screen, approximately 15 wt % to 20 wt % of material having a particle size less than #4 screen but greater than #8 screen, approximately 10 wt % to 15 wt % of material having a particle size less than #8 screen but greater than #16 screen, approximately 10 wt % to 15 wt % of material having a particle size less than #16 screen but greater than #30 screen and approximately 20 wt % to 30 wt % of material having a particle size less than #30 screen but greater than #100 screen. The fines of the most preferred sulfur concrete composition is a fine filler of silica dust or flyash having a particle size less than about #200 screen. All screen sizes referred to immediately above are U.S. sieve sizes.

Preferably, the sulfur concrete is substantially free of moisture; the inclusion of moisture degrades the performance of the sulfur concrete and reduces the available time to finish the concrete after it has been poured. Significantly, melting of the solid-state sulfur concrete units improves the quality of the sulfur concrete because the remelting process tends to remove moisture.

While the premixed and preformed thermoplastic units of the present invention are particularly well suited for sulfur concrete, they may additionally be used with other thermoplastic materials such as hot melt glues and paints, asphalt and roofing and driveway sealants. For many of these applications it may be preferred to provide the body of thermoplastic material in a container to permit repeated melting and refreezing.

Heating fluids other than steam, such as hot oil which can be safely used to reheat the thermoplastic material may be used in accordance with the present invention. Additionally, heater means other than tubing adapted for the passage of heating fluids such as insulated electrical heating elements may also be used in accordance with the present invention. However, because of the cost of heater means comprising tubing as compared to insulated electrical heating elements, it is presently preferred that the heater means comprise a tube embedded in the body of thermoplastic material as disclosed therein.

Although it is preferred that the body of thermoplastic material be cylindrical in shape and that the heater means comprise a helical tube, other configurations may also be used in accordance with the present invention. For instance, the body may be cubical or any other appropriate shape and the tube comprising the heater means will accordingly be embedded substantially throughout the body in such a manner that it is adapted for the melting of the thermoplastic material in a reasonable period of time, all within the scope of this invention.

As various changes could be made in the above products and methods, without departing from the scope of the invention, it is intended that all matter contained in the above description or shown i the accompanying drawings shall be interpreted as illustrative and not in a limiting sense.

I claim:

1. A preformed one-piece unit in solid-state form adapted for transport and subsequent conversion to a fluid state, comprising a body of thermoplastic material having heater means embedded therein adapted for melting the thermoplastic material, the unit being adapted for storage and transport with said body in solid state form and subsequent heating of the body via said heater means at a work site to provide the thermoplastic material in a fluid state.

2. A preformed unit as set forth in claim 1 wherein the heater means is adapted for heating the body to a temperature in excess of the melting point of the thermoplastic material.

3. A preformed unit as set forth in claim 1 wherein the heater means comprises a continuous tube embedded in the body, the tube having an inlet and an outlet outside of the body and adapted for the passage of a heating fluid therethrough.

4. A preformed unit as set forth in claim 1 wherein the heater means is attached to a frame to hold the heater means in place while the thermoplastic material is being poured about the heater means.

5. A preformed unit as set forth in claim 1, wherein the thermoplastic body is packaged within a container.

6. A preformed unit as set forth in claim 1 further comprising a lifting lug and wherein substantially the entire body of thermoplastic material is exposed to the surrounding environment.

7. A preformed unit in solid-state form adapted for transport and subsequent conversion to a fluid state, comprising a body of sulfur concrete and a tube having a portion of its length embedded within said body, the tube being within about 8 inches of any point within the body and adapted for heating of the body at a work site via passing a heating fluid through the tube.

8. A preformed unit as set forth in claim 7 wherein the body contains approximately one cubic yard of sulfur concrete, the length of the tube embedded in the sulfur concrete forming two helixes of differing diameters, the tube having a tubular diameter between about ¼ inch and 1 inch.

9. A preformed unit as set forth in claim 7 wherein the body of sulfur concrete is packaged in a 55 gallon drum.

10. A method of incorporating a thermoplastic material into a mass comprising
providing a one-piece body of solid state thermoplastic material having heater means embedded therein for heating the body,
transporting the solid body having the heater means embedded therein from one location to a second location,
melting the body of solid state thermoplastic material via the heater means, and
incorporating the melted thermoplastic material into the mass.

11. A method of incorporating sulfur concrete into a mass at a work site comprising
providing at the work site a transportable solid state body of sulfur concrete material having heater means embedded therein for heating the body,
melting the body of solid state sulfur concrete material via the heater means, and
incorporating the melted sulfur concrete material into the mass.

12. A method as set forth in claim 11 wherein said heating fluid is steam.

13. A method as set forth in claim 12 wherein multiple preformed units are connected in series to the source of steam.

14. A method as set forth in claim 11 wherein said steam is saturated and at a pressure between about 45 psig and about 70 psig.

15. A method as set forth in claim 11 wherein said steam is saturated and at a pressure of about 55 psig.

16. A method as set forth in claim 11 wherein said body is wrapped with insulating material as the body is being melted.

17. A method as set forth in claim 11 wherein said heating fluid is hot oil.

18. A preformed unit in solid-state form adapted for transport and subsequent conversion to a fluid state, comprising a body of sulfur concrete having heater means embedded therein adapted for storage and transport with said body in solid state form and subsequent heating of the body via said heater means at a work site to provide the sulfur concrete in a fluid state.

19. A preformed unit as set forth in claim 18 wherein the sulfur concrete body is cylindrical in shape and the heater means comprises a helical tube concentric with and extending substantially the entire length of the body 20. A performed unit as set forth in claim 18 wherein the heater means is within about 8 inches of any point within the sulfur concrete body.

21. A preformed unit as set forth in claim 18 wherein the heater means is within about 6 inches of any point within the sulfur concrete body.

* * * * *